(12) United States Patent
Stavrianou et al.

(10) Patent No.: US 9,396,179 B2
(45) Date of Patent: Jul. 19, 2016

(54) METHODS AND SYSTEMS FOR ACQUIRING USER RELATED INFORMATION USING NATURAL LANGUAGE PROCESSING TECHNIQUES

(75) Inventors: Anna Stavrianou, Grenoble (FR); Caroline Brun, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 527 days.

(21) Appl. No.: 13/599,043

(22) Filed: Aug. 30, 2012

(65) Prior Publication Data
US 2014/0067369 A1 Mar. 6, 2014

(51) Int. Cl.
| | |
|---|---|
| G10L 21/00 | (2013.01) |
| G10L 25/00 | (2013.01) |
| G10L 15/00 | (2013.01) |
| G10L 15/18 | (2013.01) |
| G10L 15/04 | (2013.01) |
| G10L 21/06 | (2013.01) |
| G10L 15/26 | (2006.01) |
| G10L 19/00 | (2013.01) |
| G06F 17/27 | (2006.01) |
| G06F 15/16 | (2006.01) |
| G06F 17/30 | (2006.01) |
| H04M 3/51 | (2006.01) |
| H04M 3/493 | (2006.01) |
| G06Q 30/00 | (2012.01) |
| G06F 7/00 | (2006.01) |

(52) U.S. Cl.
CPC ........ *G06F 17/2775* (2013.01); *G06F 17/2785* (2013.01); *G06Q 30/016* (2013.01); *H04M 3/493* (2013.01); *H04M 3/51* (2013.01); *H04M 3/5158* (2013.01); *H04M 3/5191* (2013.01)

(58) Field of Classification Search
CPC .......... G06F 17/2785; G06F 17/30864; G06F 17/30067; G10L 15/262; G10L 15/187; G10L 15/22; G10L 15/06; H04L 29/08072
USPC ............. 704/275, 257, 201, 9, 254, 276, 235; 709/203; 707/723, 769, 758, 741, 708, 707/639, 749, 765, 748, 661, 728
See application file for complete search history.

(56) References Cited

U.S. PATENT DOCUMENTS

| | | | | |
|---|---|---|---|---|
| 5,651,095 | A * | 7/1997 | Ogden | G10L 13/10 704/257 |
| 6,029,195 | A * | 2/2000 | Herz | G06F 17/30867 348/E7.056 |
| 6,263,335 | B1 * | 7/2001 | Paik | G06F 17/30707 |
| 6,460,036 | B1 * | 10/2002 | Herz | G06F 17/30867 348/E7.056 |
| 6,505,157 | B1 * | 1/2003 | Elworthy | G06F 17/277 704/255 |
| 6,564,210 | B1 * | 5/2003 | Korda | G06F 17/30 |
| 6,691,106 | B1 * | 2/2004 | Sathyanarayan | G06F 17/30867 |

(Continued)

*Primary Examiner* — Paras D Shah
*Assistant Examiner* — Anne Thomas-Homescu
(74) *Attorney, Agent, or Firm* — Jones Robb, PLLC

(57) ABSTRACT

Systems and methods for acquiring information associated with a user by using NLP techniques are disclosed. One or more phrases are classified in one or more categories at least partly on the basis of a period for which a product has been used by the user, the user's experience with the product, preferences of the user, or needs of the user by applying one or more natural language processing (NLP) techniques. The one or more phrases are extractable from an electronic publication at least partly on the basis of on a predefined set of verbs, a predefined set of domain-specific terms, and terms indicative of temporal information. One or more terms from the classified phrases are extracted, in which the one or more terms are indicative of the information about the user.

15 Claims, 4 Drawing Sheets

(56) References Cited

U.S. PATENT DOCUMENTS

| | | | | |
|---|---|---|---|---|
| 6,751,606 B1* | 6/2004 | Fries | G06F 17/30864 | |
| 6,981,040 B1* | 12/2005 | Konig | G06F 17/30867 | 707/E17.109 |
| 7,082,427 B1* | 7/2006 | Seibel | G06F 17/30616 | 705/26.1 |
| 7,177,904 B1* | 2/2007 | Mathur | G06F 21/6245 | 709/203 |
| 7,284,191 B2* | 10/2007 | Grefenstette | G06F 17/30867 | 707/E17.058 |
| 7,676,034 B1* | 3/2010 | Wu | H04M 3/5233 | 379/265.01 |
| 7,698,129 B2* | 4/2010 | Adachi | G06F 17/2705 | 704/1 |
| 7,698,261 B1* | 4/2010 | Khoshnevisan | G06F 17/30864 | 707/999.003 |
| 7,783,622 B1* | 8/2010 | Vandermolen | G06F 17/30867 | 707/708 |
| 7,853,485 B2* | 12/2010 | Song | G06F 17/30702 | 705/26.1 |
| 7,890,871 B2* | 2/2011 | Etkin | G06F 17/30699 | 715/738 |
| 7,979,880 B2* | 7/2011 | Hosea | H04N 21/25891 | 709/219 |
| 8,014,996 B1* | 9/2011 | Kinder | G06F 17/274 | 704/1 |
| 8,254,535 B1* | 8/2012 | Madhavapeddi | H04M 3/493 | 379/88.14 |
| 8,341,529 B1* | 12/2012 | Li | G06F 17/30861 | 715/741 |
| 8,346,563 B1* | 1/2013 | Hjelm | G10L 15/1822 | 379/88.01 |
| 8,423,349 B1* | 4/2013 | Huynh | G06F 17/2881 | 704/9 |
| 8,423,565 B2* | 4/2013 | Redlich | G06F 17/30395 | 707/758 |
| 8,429,106 B2* | 4/2013 | Downs | G06F 17/2745 | 706/21 |
| 8,494,978 B2* | 7/2013 | Pinckney | G06N 99/005 | 706/11 |
| 8,725,711 B2* | 5/2014 | O'Reilly | G06F 17/30699 | 707/706 |
| 8,751,424 B1* | 6/2014 | Wojcik | G06F 21/554 | 706/20 |
| 8,849,721 B2* | 9/2014 | Fedorov | G06Q 10/101 | 705/319 |
| 8,892,630 B1* | 11/2014 | Curtis | G06Q 50/01 | 709/203 |
| 8,930,370 B2* | 1/2015 | Musgrove | G06F 17/30864 | 707/740 |
| 8,977,613 B1* | 3/2015 | Cooke | G06F 17/30867 | 707/732 |
| 8,977,687 B2* | 3/2015 | Chandar | | 709/204 |
| 8,983,995 B2* | 3/2015 | Hsu | G06F 17/3064 | 705/26.62 |
| 8,990,200 B1* | 3/2015 | Christensen | G06F 17/30528 | 707/723 |
| 9,015,301 B2* | 4/2015 | Redlich | G06Q 10/10 | 707/609 |
| 9,025,890 B2* | 5/2015 | Hosomi | G06F 17/30705 | 382/224 |
| 9,031,863 B2* | 5/2015 | Bagherjeiran | G06Q 30/02 | 705/14.49 |
| 9,032,290 B2* | 5/2015 | Shepherd et al. | | 715/262 |
| 2001/0021909 A1* | 9/2001 | Shimomura | G10L 15/22 | 704/275 |
| 2002/0052901 A1* | 5/2002 | Guo | G06F 17/27 | 715/247 |
| 2002/0062316 A1* | 5/2002 | Maehiro | G06Q 10/107 | |
| 2002/0177991 A1* | 11/2002 | Ejerhed | G06F 17/277 | 704/2 |
| 2003/0028451 A1* | 2/2003 | Ananian | G06F 17/30867 | 705/26.42 |
| 2003/0220747 A1* | 11/2003 | Vailaya | G06F 17/30569 | 702/19 |
| 2004/0015365 A1* | 1/2004 | Ohmori | G10L 15/22 | 704/276 |
| 2004/0193420 A1* | 9/2004 | Kennewick | G06F 17/30654 | 704/257 |
| 2005/0138026 A1* | 6/2005 | Liu | G06F 17/3071 | |
| 2005/0187932 A1* | 8/2005 | Kanayama | G06F 17/2785 | |
| 2006/0004731 A1* | 1/2006 | Seibel | G06F 17/30719 | |
| 2006/0047637 A1* | 3/2006 | Meyerzon | G06F 17/30619 | |
| 2006/0069589 A1* | 3/2006 | Nigam | G06Q 30/02 | 706/55 |
| 2006/0112146 A1* | 5/2006 | Song | G06Q 10/10 | |
| 2006/0271353 A1* | 11/2006 | Berkan | G06F 17/30864 | 704/9 |
| 2007/0011154 A1* | 1/2007 | Musgrove | G06F 17/2785 | |
| 2007/0043761 A1* | 2/2007 | Chim | G06F 17/30643 | |
| 2007/0050191 A1* | 3/2007 | Weider | G06F 17/30864 | 704/275 |
| 2007/0094247 A1* | 4/2007 | Chowdhury | G06F 17/30864 | |
| 2007/0118519 A1* | 5/2007 | Yamasawa | G06F 17/30976 | |
| 2007/0130112 A1* | 6/2007 | Lin | G06F 17/3002 | |
| 2007/0150234 A1* | 6/2007 | Wicks | G06F 17/30899 | 702/182 |
| 2007/0179776 A1* | 8/2007 | Segond | G06F 17/2247 | 704/9 |
| 2007/0239537 A1* | 10/2007 | Protheroe | G06Q 30/02 | 705/14.54 |
| 2008/0086754 A1* | 4/2008 | Chen | H04L 29/06027 | 725/105 |
| 2008/0167028 A1* | 7/2008 | Gintz | H04M 3/527 | 455/419 |
| 2008/0189269 A1* | 8/2008 | Olsen | G06F 17/30864 | |
| 2008/0228467 A1* | 9/2008 | Womack | G06F 17/271 | 704/9 |
| 2008/0294624 A1* | 11/2008 | Kanigsberg | G06F 17/30867 | |
| 2009/0012949 A1* | 1/2009 | Thompson | G06F 17/30867 | |
| 2009/0048927 A1* | 2/2009 | Gross | G06F 17/30867 | 705/14.42 |
| 2009/0070103 A1* | 3/2009 | Beggelman | G06F 17/27 | 704/9 |
| 2009/0132385 A1* | 5/2009 | Inoue | G06Q 30/0601 | 705/26.1 |
| 2009/0187467 A1* | 7/2009 | Fang | G06F 17/30699 | 705/7.29 |
| 2009/0190159 A1* | 7/2009 | Toscano | H04N 1/00212 | 358/1.15 |
| 2009/0198666 A1* | 8/2009 | Winston | G06Q 50/01 | |
| 2009/0222551 A1* | 9/2009 | Neely | G06Q 30/02 | 709/224 |
| 2009/0327243 A1* | 12/2009 | Pradhan | G06F 17/30699 | |
| 2010/0042609 A1* | 2/2010 | Wu | G06F 17/30247 | 707/749 |
| 2010/0042749 A1* | 2/2010 | Barton | G06F 1/3203 | 710/1 |
| 2010/0114561 A1* | 5/2010 | Yasin | G06F 17/3071 | 704/9 |
| 2010/0179801 A1* | 7/2010 | Huynh | G06F 17/2881 | 704/1 |
| 2010/0205014 A1* | 8/2010 | Sholer | G06Q 40/08 | 705/4 |
| 2010/0262599 A1* | 10/2010 | Nitz | G06F 17/3087 | 707/723 |
| 2011/0010415 A1* | 1/2011 | Kodama | G06F 17/30867 | 709/203 |
| 2011/0078167 A1* | 3/2011 | Sundaresan | G06F 17/2785 | 707/765 |
| 2011/0093453 A1* | 4/2011 | Frayman | G06Q 50/18 | 707/723 |
| 2011/0106829 A1* | 5/2011 | Pradhan | G06F 17/30707 | 707/765 |
| 2011/0125734 A1* | 5/2011 | Duboue | G09B 7/00 | 707/723 |
| 2011/0144980 A1* | 6/2011 | Rysenga | G06Q 10/109 | 704/201 |
| 2011/0166860 A1* | 7/2011 | Tran | G06Q 30/0209 | 704/254 |
| 2011/0173174 A1* | 7/2011 | Flitcroft | G06F 17/30864 | 707/707 |
| 2011/0179009 A1* | 7/2011 | Nam | G06Q 30/0256 | 707/708 |

(56) References Cited

U.S. PATENT DOCUMENTS

| | | | | |
|---|---|---|---|---|
| 2011/0191337 A1* | 8/2011 | Cort | G06F 3/048 | 707/728 |
| 2011/0202406 A1* | 8/2011 | Suomela | G06Q 30/02 | 705/14.52 |
| 2011/0246181 A1* | 10/2011 | Liang | G06F 17/2775 | 704/9 |
| 2011/0258049 A1* | 10/2011 | Ramer | G06F 17/30867 | 705/14.66 |
| 2011/0289076 A1* | 11/2011 | Boyle | G06F 17/289 | 707/723 |
| 2011/0302117 A1* | 12/2011 | Pinckney | G06Q 30/02 | 706/12 |
| 2012/0102050 A1* | 4/2012 | Button | G06N 5/043 | 707/749 |
| 2012/0167010 A1* | 6/2012 | Campbell | G06F 17/30693 | 715/825 |
| 2012/0203723 A1* | 8/2012 | Huang | G06Q 50/01 | 706/20 |
| 2012/0209852 A1* | 8/2012 | Dasgupta | G06F 17/30707 | 707/740 |
| 2012/0209879 A1* | 8/2012 | Banerjee | G06F 17/30696 | 707/776 |
| 2012/0232897 A1* | 9/2012 | Pettyjohn | G06Q 30/0603 | 704/235 |
| 2012/0254917 A1* | 10/2012 | Burkitt | G06F 17/30817 | 725/40 |
| 2012/0266258 A1* | 10/2012 | Tuchman | H04L 63/104 | 726/28 |
| 2012/0296845 A1* | 11/2012 | Andrews | G06F 17/2785 | 705/36 R |
| 2012/0310971 A1* | 12/2012 | Tran | A63F 13/06 | 707/769 |
| 2012/0316916 A1* | 12/2012 | Andrews | G06Q 40/08 | 705/7.28 |
| 2012/0317136 A1* | 12/2012 | Papish | G06F 17/30867 | 707/769 |
| 2013/0073280 A1* | 3/2013 | O'Neil | G06F 17/27 | 704/9 |
| 2013/0073568 A1* | 3/2013 | Federov | G06F 17/30867 | 707/749 |
| 2013/0073979 A1* | 3/2013 | Shepherd | G06Q 50/01 | 715/744 |
| 2013/0073983 A1* | 3/2013 | Rasmussen | G06Q 30/02 | 715/753 |
| 2013/0096909 A1* | 4/2013 | Brun | G06F 17/271 | 704/9 |
| 2013/0110842 A1* | 5/2013 | Donneau-Golencer | G06F 17/30702 | 707/741 |
| 2013/0144605 A1* | 6/2013 | Brager | G06F 17/3061 | 704/9 |
| 2013/0159254 A1* | 6/2013 | Chen | G06F 17/30867 | 707/639 |
| 2013/0179149 A1* | 7/2013 | Talley | G06F 17/2775 | 704/9 |
| 2013/0232159 A1* | 9/2013 | Daya | G06Q 50/01 | 707/758 |
| 2013/0268260 A1* | 10/2013 | Lundberg | G06F 17/28 | 704/8 |
| 2013/0268408 A1* | 10/2013 | Mebed | G06Q 30/0641 | 705/26.62 |
| 2013/0275429 A1* | 10/2013 | York | G06F 17/30029 | 707/737 |
| 2013/0339858 A1* | 12/2013 | Corfield | G10L 15/30 | 715/728 |
| 2014/0040312 A1* | 2/2014 | Gorman | G06F 17/2785 | 707/771 |
| 2014/0136323 A1* | 5/2014 | Zhang | G06F 17/30483 | 705/14.53 |
| 2015/0186504 A1* | 7/2015 | Gorman | G06F 17/30684 | 707/752 |

\* cited by examiner

METHODS AND SYSTEMS FOR ACQUIRING USER RELATED INFORMATION USING NATURAL LANGUAGE PROCESSING TECHNIQUES

TECHNICAL FIELD

The presently disclosed embodiments are related, in general, to a data mining system. More particularly, the presently disclosed embodiments are related to systems and methods for acquiring information about a user by using (NLP) techniques.

BACKGROUND

A typical user profiling system collects information related to a user to create a user profile. Such information may include, but not limited to, name, sex, hobbies, area of interest, and the like. In one scenario, the user profiling system may obtain such information from the user. In another scenario, the user profiling system may obtain such information about the user by tracking or monitoring activities performed by the user on a daily basis. For example, the user profiling system tracks user activity (e.g., the user's web browsing pattern) by monitoring cookies associated with the websites accessed by the user. For instance, the user may frequently visit a website to search and buy latest electronic gadgets. The user profiling system may track the cookies to determine that the user is interested in electronic gadgets. Accordingly, the user profiling system may create or update the user profile.

SUMMARY

According to embodiments illustrated herein, there is provided a method of acquiring information about a user, the method includes classifying one or more phrases in one or more categories at least partly on the basis of a period for which a product has been used by the user, the user's experience with the product, preferences of the user, or needs of the user by applying one or more natural language processing (NLP) techniques. The one or more phrases are extractable from an electronic publication based, at least in part, on a predefined set of verbs, a predefined set of Domain-specific terms, and terms indicative of temporal information. Further, the method includes extracting one or more terms form the classified phrases. The one or more terms are indicative of the information about the user.

According to embodiments illustrated herein, there is provided a method of providing one or more services to a user. The method includes classifying one or more phrases in one or more categories at least partly on the basis of a period for which a product has been used by the user, the user's experience with the product, preferences of the user, or needs of the user by applying one or more natural language processing (NLP) techniques. The one or more phrases are extractable from an electronic publication based, at least in part, on a predefined set of verbs, a predefined set of Domain-specific terms, and terms indicative of temporal information. The method further includes extracting one or more terms form the classified phrases. The one or more terms are indicative of the information about the user. Further more the method includes creating a user profile based on the classified phrases. Finally, the method includes providing the one or more services to the user based on the user profile. The one or more services correspond to product support, product recommendation, and troubleshooting.

According to embodiments illustrated herein, there is provided a system for creating a user profile. The system includes a search module configured to search for an electronic publication on one or more online sources. A natural language processing (NLP) module configured to extract one or more phrases from the electronic publication based, at least in part, on a predefined set of verbs, a predefined set of Domain-specific terms, and terms indicative of temporal information. The NLP module is further configured to classify the one or more phrases in one or more categories at least partly on the basis of a period for which a product has been used by the user, the user's experience with the product, preferences of the user, or needs of the user. A user profile manager configured to create the user profile based on the classified phrases.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
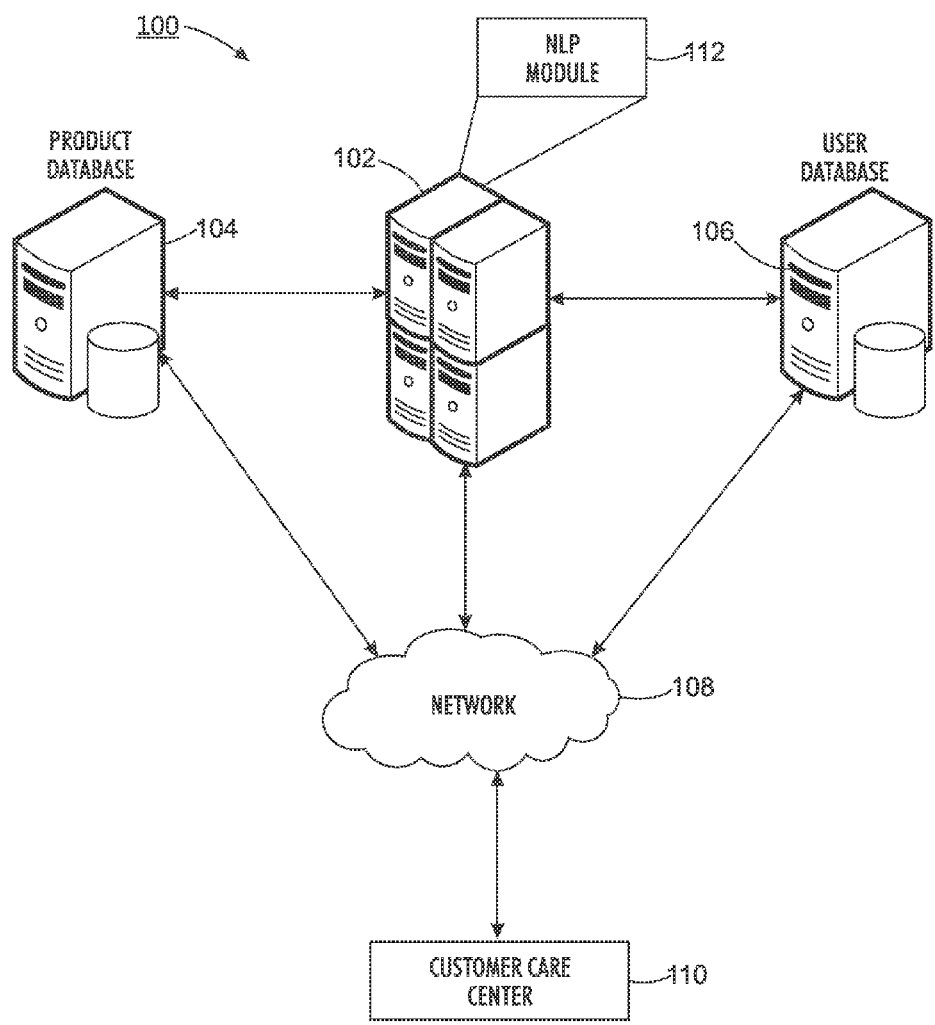
FIG. 1 is a block diagram illustrating a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "user profile" refers to an electronic collection of information associated with a user. In an embodiment, such information may include, but not limited to, name, age, sex, hobbies, user's interests, user's preferences, user's needs, and so forth.

A "customer support center" refers to a system that provides one or more services to a user. In an embodiment, the user sends a query to the customer support center asking for information on a product. The customer support center provides the information of the product. In an embodiment, the customer support center may provide one or more services to the user based on the query. For example, the customer care center may recommend one or more similar products to the user. In an embodiment, the one or more service includes, but is not limited to, product support, product recommendation, and troubleshooting.

A "phrase" refers to a sequence of two or more words arranged in a grammatical construction and acting as a unit in a sentence.

"Categories" refer to one or more groups, in which one or more phrases are be classified based on the context of the one or more phrases. In an embodiment, the categories include user's preferences, needs, and experience.

An "electronic publication" refers to one or more articles published by a user. The one or more articles may include, but not limited to, an e-mail, a post on a social networking website, a post on a blog, and the like. In an embodiment, the electronic publication includes the user's review on a product, user's needs, and user's preferences.

A "product" refers to an object that a user can buy or own. Some examples of the product may include, but not limited to, device, a policy, a bond, shares, and the like.

FIG. 1 is a block diagram illustrating a system environment 100, in which various embodiments can be implemented. The system environment 100 includes an analytic server 102, a product database 104, a user database 106, a network 108, and a customer support center 110. The analytic server 102 further includes a natural language processing (NLP) module 112.

The analytic server 102 searches for one or more electronic publications on one or more online sources. Further, the analytic server 102 includes the NLP module 112 that analyzes the one or more electronic publications. The NLP module 112 extracts one or more phrases from the one or more electronic publications. Thereafter, the NLP module 112 classifies each of the one or more phrases in one or more categories by applying the first set of rules. Based on the classified phrases, the NLP module 112 extracts the one or more terms from each of the classified phrases by applying the second set of rules. In an embodiment, some examples of the NLP techniques implemented by the NLP module 112 includes, but not limited to, word tokenization, word lemmatization, part-of-speech tagging, Named Entity detection, syntactic parsing. Thereafter, the analytic server 102 creates the user profile based on the one or more terms. The analytic server 102 stores the user profile in the user database 106. In an embodiment, the analytic server 102 includes one or more analytic tools, such as the NLP module 112, which further includes a natural language parser and a part of speech (POS) tagger. The analytic server 102 can be realized through various technologies such as Apache® web server and Microsoft® web server. The analytic server 102 is described in detail in conjunction with FIG. 4.

The product database 104 includes information related to various products. In an embodiment, the information may include, but not limited to, model number, price, features, and user reviews on the product. In an embodiment, the product database 104 may receive a query to extract information related to a product. In an embodiment, the product database 104 may receive the query from the customer support center 110. In an alternate embodiment, the product database 104 may receive the query from the analytic server 102. The product database 104 may be realized through various technologies such as, but not limited to, Microsoft® SQL server, My SQL, and ODBC server.

The user database 106 is a repository of the user profiles. The analytic server 102 creates and updates the user profiles in the user database 106. The user database 106 may be realized through various technologies such as, but not limited to, Microsoft® SQL server, My SQL, and ODBC server.

The network 108 corresponds to a medium through which the content and the messages flow between various components (e.g., the analytic server 102, the product database 104, the user database 106, and the customer support center 110) of the system environment 100. Examples of the network 108 may include, but are not limited to, a Wireless Fidelity (WiFi) network, a Wireless Area Network (WAN), a Local Area Network (LAN), and a Metropolitan Area Network (MAN). Various devices in the system environment 100 can connect to the network 108 in accordance with various wired and wireless communication protocols, such as Transmission Control Protocol and Internet Protocol (TCP/IP), User Datagram Protocol (UDP), 2G, 1G or 4 G communication protocols.

The customer support center 110 receives one or more requests/query from a user. In an embodiment, the customer support center 110 receives the query regarding a product. In an embodiment, the query received by the customer support center corresponds to a question asked by the user about a product. In an embodiment, the user may send the query in form of, but not limited to, an e-mail, voice call, Short Message Service (SMS), or any other means of transmitting the query.

On receiving the query, the customer support center 110 accesses the user database 106 to extract user profile associated with the user. If the user profile is present in the user database 106, the customer support center 110 extracts the user profile. If the user profile is not present, the customer support center 110 sends a request to the analytic server 102 to create the user profile. In an embodiment, a customer care executive at the customer support center 110 interacts with the user based on the information available in the user profile. In an embodiment, the customer care executive recommends one or more products to the user based on the user profile. In an alternate embodiment, the analytic server 102 provides one or more services to the user based on the user profile. For example, post the creation of the user profile, the analytic server 102 extracts one or more product information from the product database 104. Thereafter, the analytic server 102 recommends the one or more products to the user without manual intervention of the customer care executive at the customer support center 110. The analytic server 110 may provide the one or more services to the user over an E-mail, Interactive voice response IVR system, or FAX.

Figure 2:
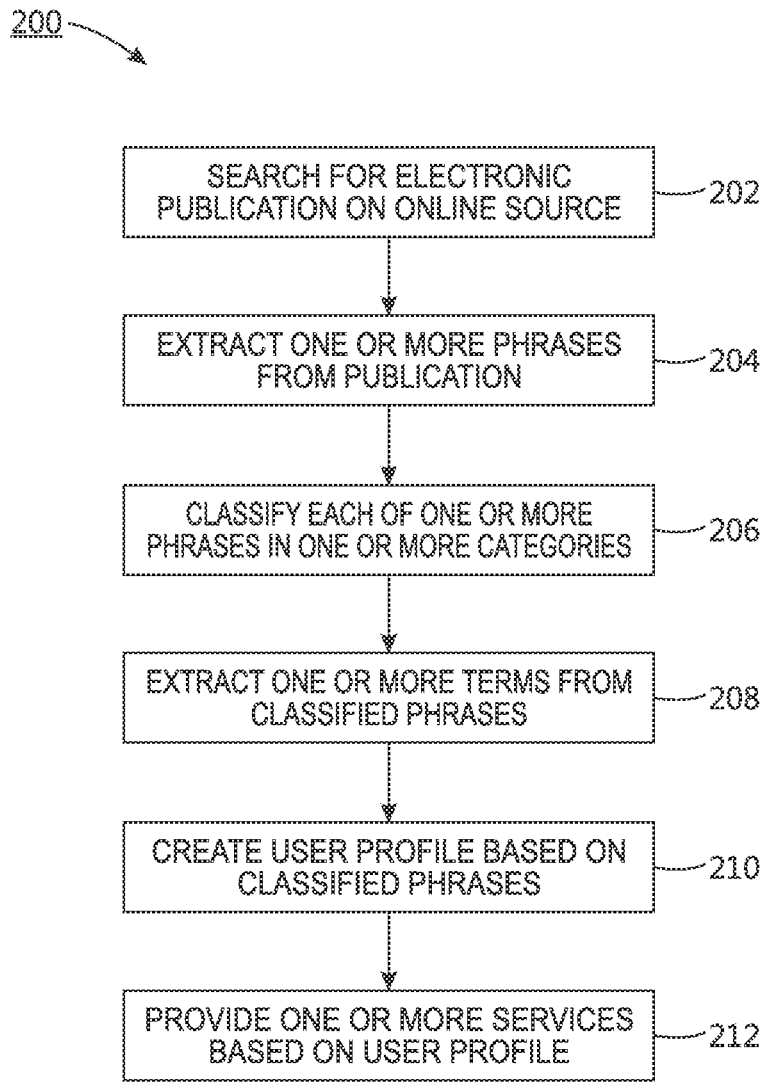
FIG. 2 is a flowchart illustrating a method of acquiring information about a user in accordance with at least one embodiment.

FIG. 2 is a flowchart 200 illustrating a method of acquiring information about a user in accordance with at least one embodiment. The flowchart 200 is described in conjunction with FIG. 1.

The customer support center 110 receives a query pertaining to any requirement from a user. In an embodiment, the query may be in the form of an E-mail or a voice-call. On receiving the query, the customer support center 110 accesses the user database 106 to extract the user profile associated with the user to better assist the user. If the user profile is present in the user database 106, the customer support center 110 extracts the user profile. If the user profile is not present, the customer support center 110 sends a request to the analytic server 102 to create the user profile.

At step 202, one or more electronic publications are searched on one or more online sources. In an embodiment, the search for the electronic publications is performed by the analytic server 102 in response the request by the customer support center 110. On receiving the request to create the user profile, the analytic server 102 acquires information about the user by searching for the electronic publications posted by the user. For example, the user posts a comment on a blog stating, "ABC printer has a speed of 12 ppm". The analytic server 102 considers such a post as the electronic publication. In an embodiment, the one or more online sources may correspond to a product review website, a forum, a blog, or an E-mail.

At step 204, one or more phrases are extracted from the electronic publications. In an embodiment, the NLP module 112 extracts the one or more phrases from the electronic publications. The NLP module 112 includes a natural language parser that separates various parts of speech (POS) in a sentence. The natural language parser is executed through each sentence in the electronic publications to extract one or more phrases. The natural language parser utilizes a word-list database to extract the one or more phrases. In an embodiment, the word-list database includes a predefined set of verbs, a predefined set of domain-specific terms, and terms indicative of temporal information, and the like. Further, the natural language parser utilizes various online sources including, but not limited to, Dictionary.Com®, Thesaurus®, and WordWeb®, to determine synonyms for the words in the word-list database. An example of the word-list database is described below in conjunction with Table 1.

TABLE 1

Example word-list database

| Verbs | Temporal terms | Negation terms | Domain-specific terms |
|---|---|---|---|
| Buy | Year | Don't | Printer |
| Purchase | Late | Never | Scanner |
| Own | Month | Avoid | FAX |
| Need | Date | | MFD |

For example, the natural language parser analyzes a sentence in an electronic publication that recites, "I bought ABC printer in 2002". Firstly, the natural language parser determines various parts of speech in the sentence, i.e., subject, verb, and object. The natural language parser classifies "I" as subject, "bought" as verb, and "ABC printer" as object. Thereafter, the natural language parser compares each part of speech extracted from the sentence with the word-list database (Table 1) to determine whether the phrase is relevant. As the sentence includes terms "bought" (i.e., past tense of term "buy") and "ABC printer" (i.e., domain-specific term), the sentence is relevant. Finally, the natural language parser extracts the phrase "I bought ABC printer in 2002" from the electronic publication.

A person having ordinary skill in the art would understand that the terms mentioned in the table 1 may further include synonyms of the terms and various verb-forms variations of the terms without departing from the scope of the disclosed embodiments.

At step 206, the one or more phrases are classified under one or more categories, based on the context of each of the one or more phrases. In an embodiment, the NLP module 112 categorizes the one or more phrases in one or more categories on the basis of the context of the phrases. In an embodiment, the one or more categories include, but are not limited to, user's experience, user's preferences, and user's needs. In order to determine the context of the one or more phrases, the NLP module 112 maintains a semantically classified second word-list database and a first set of rules. The semantically classified second word-list database is described below in conjunction with Table 2.

TABLE 2

Semantically classified second word-list database

| Possession of product | Experience with product | Needs of user | Need of user (implicit) | Preference of users |
|---|---|---|---|---|
| Buy | Previous | Need | Because of | Never |
| Had | Before | Use | For | Don't |
| Own | In the past | Intentions | | Avoid |
| Have | | Want | | Like |
| | | Desire | | |

In an embodiment, any phrase that includes the terms mentioned in the column titled "Possession of product" may signify that the user owns a product. Similarly, any phrase that includes the terms mentioned in the column titled "Needs of user" may signify the user's requirements or expectations.

A person having ordinary skill in the art would understand that the terms mentioned in table 2 may further include synonyms of the terms and various verb-forms variations of the terms without departing from the scope of the disclosed embodiments.

In order to classify the one or more phrases in the one or more categories, the NLP module 112 applies a first set of rules on each of the one or more phrases. In an embodiment, for a phrase to classify under the category "user's experience", the phrase should qualify the following rules:

If (Subject==("Possession of product", (pronoun)) and
  Object==("Domain-specific terms" (mentioned
  in table 1)) then (classify the phrase in "user's
  experience")    (1)

If (Subject==("Experience with product", (pronoun))
  and Object==("Domain-specific terms" (mentioned in table 1)) then (classify the phrase in
  "user's experience").    (2)

The rule (1) states that any phrase whose subject portion includes terms mentioned in the column titled "possession of product" (refer Table 2) and has an object portion that includes terms mentioned in the column titled "Domain-specific terms" (refer Table 1) is classified in the user's experience category. Similarly, the rule (2) states that any phrase whose subject portion includes terms mentioned in the column titled "Experience with product" (refer Table 2) and has an object portion that includes terms mentioned in the column titled "Domain-specific terms" (refer Table 1) is classified in the user's experience category.

In an embodiment, for a phrase to classify under the category "user's needs", the phrase should qualify the following rules:

If (Subject==("Needs of user", (pronoun)) and
    Object==("Domain-specific terms" (mentioned
    in table 1)) then (classify the phrase in "user's
    need")     (3)

If (Subject==("Possession of product", (pronoun)) and
    Object==("Need of user (implicit)", "other
    terms") then (classify the phrase in "user's
    need")     (4)

The rule 3 states that any phrase whose subject portion includes terms mentioned in column "Needs of user" of Table 2 and has an object portion that includes terms mentioned in column "Domain-specific terms" of Table 1 is classified in the user's needs category. The Rule 4 states that any phrase whose subject portion includes terms mentioned in column "possession of product" of Table 2 and has an object portion that includes terms mentioned in columns "needs of the user (implicit)" of Table 2 and "other terms" of Table 1 is classified in the user's needs category.

In an embodiment, for a phrase to classify under the category "user preference", the phrase should qualify the following rule:

If (Subject==("preference of user", (pronoun)) and
    Object==("Domain-specific terms" (mentioned
    in table 1)) then (classify the phrase in "user's
    preference")     (5)

Rule (5) states that any phrase whose subject portion includes terms mentioned in the column titled "preference of user" (refer Table 2) and has an object portion that includes terms mentioned in the column titled "Domain-specific terms" (refer Table 1) is classified in the user preference category.

By applying the first set of rules (e.g., rules 1-5), the NLP module 112 categorizes the one or more phrases under the one or more categories as illustrated in Table 3 below.

TABLE 3

| Classified phrases | | |
|---|---|---|
| User's experience | User's needs | User's preferences |
| "I bought XXXX printer in 2005" | "I need an integrated scanner, printer, and copier" | "I don't like ZZZZ printer" |

A person having ordinary skills in the art would understand that the above mentioned rules have been illustrated as an example. Various other types of grammatical, as well as syntactical rules can be applied to the one or more phrases without limiting the scope of the ongoing description.

At step 208, one or more terms are extracted from the classified phrases. In an embodiment, the NLP module 112 extracts the one or more terms from the classified phrases. In an embodiment, the NLP module 112 applies a second set of rules on the classified phrases to extract the one or more terms. In an embodiment, the one or more terms are indicative of the information about the user. In an embodiment, the second set of rules is applied to the classified phrases in each of the one or more categories. Following is an example of a rule applied on the phrase in the user's experience category:

If (Subject==("Possession of product", (pronoun)) and
    Object==("Domain-specific terms" (mentioned
    in table 1)) then (extract temporal term)     (6)

Experience with the product=current date−temporal
term     (7)

The rule 6 states that a temporal term is extracted from the phrase classified under the user's experience category if the subject portion of the classified phrase includes term mentioned in column "Possession of product" of Table 2 and the object portion of the phrase includes terms mentioned in column "Domain-specific terms" of Table 1. The total years of experience are calculated using the equation 7.

Following is an example of a rule applied on phrases in the user's needs category:

If (Subject==("Needs of user", (pronoun)) and
    Object==("Domain-specific terms" (mentioned
    in table 1)) then (extract other terms)     (8)

Rule 8 states that domain-specific terms are extracted from a phrase classified under the user's needs category if the subject portion of the classified phrase includes term mentioned in the column "Needs of user" of Table 2 and the object portion of the phrase includes terms mentioned in column "Domain-specific terms" of Table 1. In an embodiment, the domain-specific terms, extracted using the rule 8, correspond to the needs of the user.

Following is an example of a rule applied on phrases in the user's needs category:

If (Subject==("preference of user", (pronoun)) and
    Object==("Domain-specific terms" (mentioned
    in table 1)) then (extract other terms)     (9)

Rule 9 states that the domain-specific terms are extracted from a phrase classified under the user's needs category if the subject portion of the classified phrase includes the terms mentioned in column "Preference of user" of Table 2 and the object portion of the phrase includes terms mentioned in column "other terms" of Table 1. In an embodiment, the domain-specific terms, extracted using the rule 9, correspond to the user's preferences.

At step 210, a user profile is created based on the one or more terms extracted from the classified phrases by applying the second set of rules (e.g. rules 6-9). In an embodiment, the analytic server 102 creates the user profile. In an embodiment, the user profile includes information about the user's needs, user's preferences, and user's experience. A sample user profile is illustrated in Table 4 below.

TABLE 4

| Example user profile | |
|---|---|
| Name | User-1 |
| Age | 30 |
| Experience | XXXX printer 7 years |
| Needs | Integrated scanner, printer, copier |
| Preferences | Avoid ZZZZ printers |

At step 212, the user profile is communicated to the customer support center 110. In an embodiment, the analytic server 102 communicates the user profile to the customer support center 110. At the customer support center 110, the user profile is analyzed to determine the needs and preferences of the user. Based on the determined needs and preferences, one or more services are provided to the user. In an embodiment, the one or more services include, but are not limited to, product support, product recommendation, and troubleshooting. For example, the user profile states that the user needs a standalone FAX machine and a color printer. Further, the user profile states that the user does not like ZZZZ printer. Based on the user's needs and user's preferences, the customer support center 110 may generate a query to extract the information about one or more products that includes the standalone FAX and color printer. In an alternate embodiment, the analytic server 102 generates the query. An example query is mentioned below.

Select "product name" and "features";
From "product database 104";
where (features="standalone FAX machine" and "color printer") and (NOT product name=BBBB printer).

The customer care executive at the customer support center 110 may utilize the extracted product information to recommend one or more products to the user.

It is understood by a person having ordinary skill in the art that the scope of the disclosure should not be limited to creating the user profile using the electronic publications. In an embodiment, a query sent to the customer support center 110 over the voice call can be utilized for extracting information required to create the user profile. The voice call is converted to text using one or more speech-to-text (STT) techniques. Thereafter, the one or more phrases are extracted from the converted text using the method illustrated in the flowchart 200.

Further, it is also understood by a person having ordinary skill in the art that the scope of the invention should not be limited to recommending products such as scanner and printers to the user. Various other products, such as shares, bonds, and insurance policies, can be recommended to the users. In such a case, the domain-specific terms mentioned in Table 1 would vary in accordance with other products. For example, domains-specific terms for the domain of "insurance" would include interest rates, maturity period, principle amount, and the like.

Figure 3:
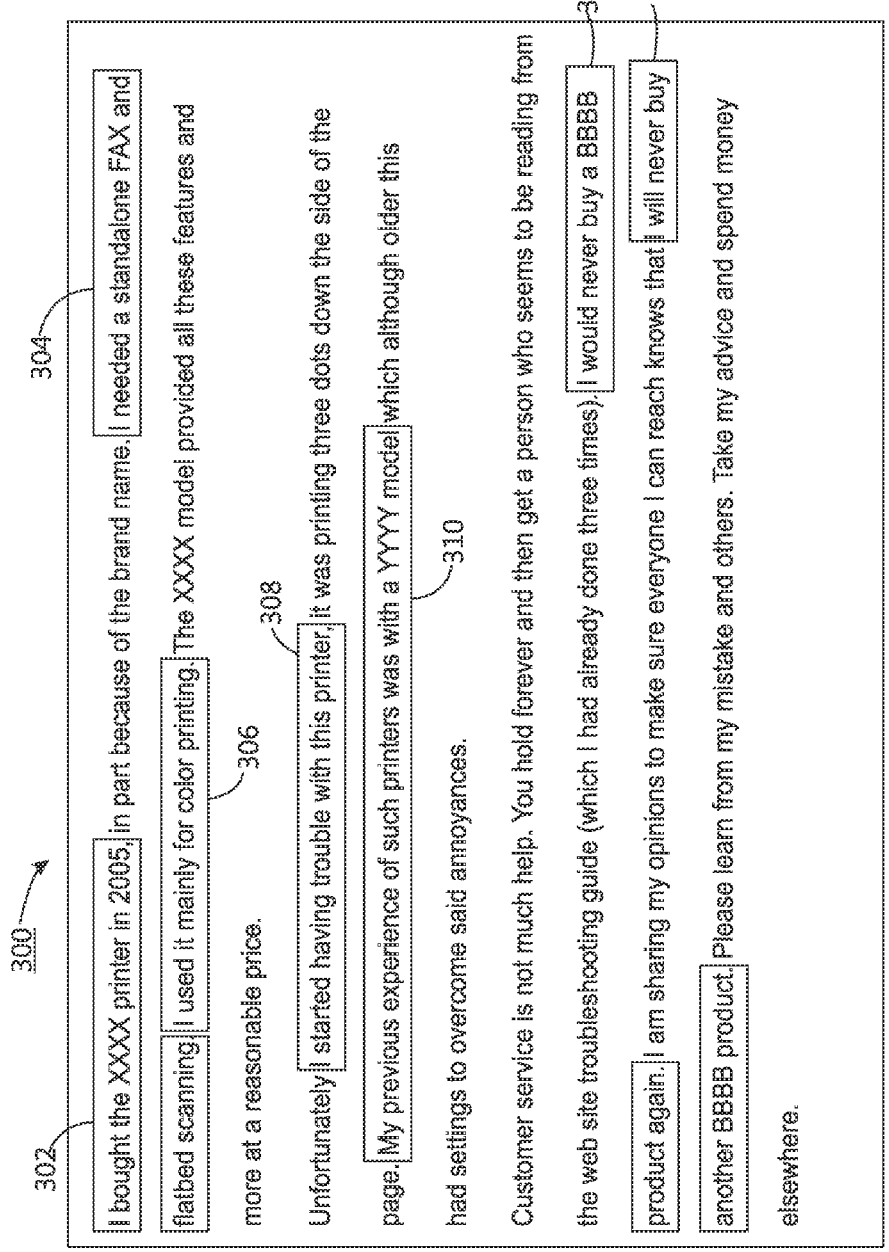
FIG. 3 is a snapshot illustrating a portion of an electronic publication in accordance with at least one embodiment.

FIG. 3 is a snapshot illustrating a portion of an electronic publication 300 in accordance with at least one embodiment. FIG. 3 is described in conjunction with FIG. 1 and FIG. 2.

The analytic server 102 extracts the electronic publication 300 from one or more online sources. The natural language parser in the NLP module 112 parses each sentence in the publication. For example, the natural language parser parses the sentence "I bought the XXXX printer in 2005" (depicted by 302) to classify "I" as subject, "bought" as verb, and "XXXX printer" as object. Similarly, the natural language parser parses the sentence "I started having trouble with this printer" (depicted by 308) to classify "I" as subject, "started having" as verb, and "this printer" as object. Thereafter, the natural language parser compares the words in the sentence 302 and the sentence 308 to determine whether the sentences 302 and 308 are relevant. As the words in the sentence 308 are not present in the word-list database (as shown in Table 1), the sentence 308 is considered as irrelevant. The natural language parser extracts one or more relevant phrases from the publication as described in the step 204.

Thereafter, the NLP module 112 classifies each of the extracted phrases into one or more categories based on the context of the extracted phrases. In an embodiment, The NLP module 112 applies the rules 1 to 5 on each of the extracted phrases to classify the one or more phrases in to the one or more categories. For example, the NLP module 112 applies the first set of rules on phrase 302 that states, "I bought the XXXX printer in 2005". By applying the rule 1 on the phrase 302, the NLP module 112 observes that the subject portion of the phrase includes the term "bought" (i.e., past tense of the term "buy" mentioned in the "possession of product" column in Table 2) and the object portion includes term "XXXX printer" (mentioned in the column "Domain-specific terms" in Table 1). Thus, the NLP module 112 classifies the phrase 302 under the category "user's experience". In another example, the NLP module 112 applies the first set of rules to the phrase 304 that states, "I needed standalone FAX and flatbed scanning". By applying the rule 3 on the phrase 304, the NLP module 112 observes that the subject portion of the phrase 304 includes the term "needed" (i.e., past tense of the term "need" mentioned in column "needs of user" in Table 2) and the object portion includes terms "Flatbed Scanning and standalone FAX" (mentioned in column "Domain-specific terms" in Table 1). Thus, the NLP module 112 classifies the phrase 304 under the user's experience category. Similarly, the NLP module 112 applies the first set of rules to each of the extracted phrases to obtain a category-wise distribution of the extracted phrases. The category-wise classification of the extracted phrases has been illustrated below in Table 5.

TABLE 5

| Classified phrases | | |
| --- | --- | --- |
| User's Experience | User's Needs | User's Preferences |
| I bought the XXXX printer in 2005 (depicted by 302) | I needed standalone FAX and flatbed scanning (depicted by 304) | I would never buy a BBBB product again (depicted by 312) |
| My previous experience of such printers was with a YYYY model (depicted by 310) | I used it mainly for color printing (depicted by 306) | I will never buy another BBBB product (depicted by 314) |

Subsequently, the analytic server 102 creates the user profile based on the classified sentences. To create the user profile, the NLP module 112 applies the second set of rules to the classified phrases to extract one or more terms from each of the classified phrases. For example, The NLP module 112 applies the rules 6 and 7 on the phrase 302 to determine that the user has been using the XXXX printer for seven years. Further, the NLP module 112 extracts such information from each of the classified phrases by applying the second set of rules. This information is utilized by the analytic server 102 to create the user profile as illustrated below in Table 6.

TABLE 6

| Example user profile | |
| --- | --- |
| Name | User-1 |
| Experience | 1. XXXX printer for 7 years |
| | 2. Previous experience with YYYY model |
| Needs | 1. Standalone FAX and flatbed scanning |
| | 2. Color printing |
| Preferences | Avoid BBBB product |

Figure 4:
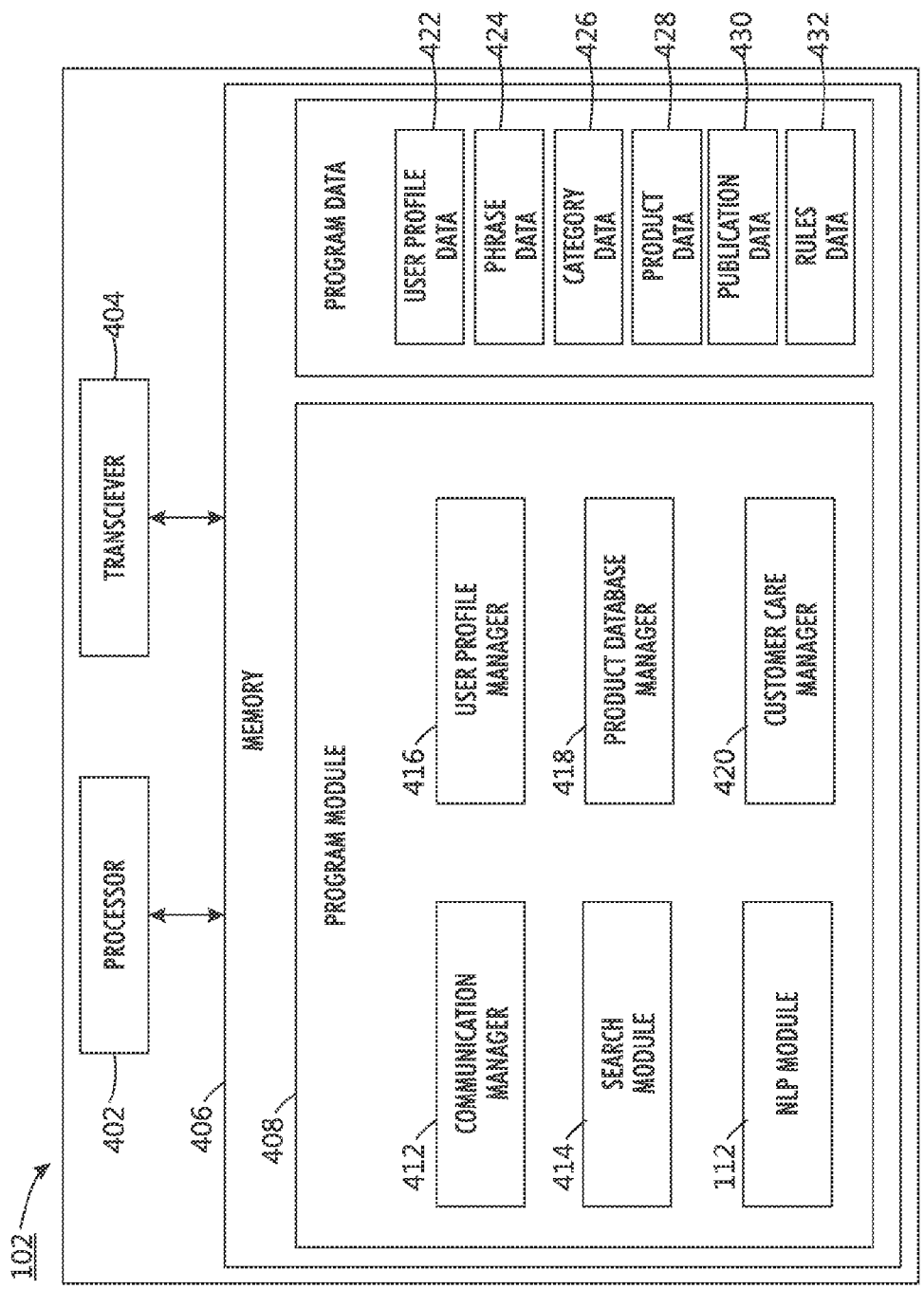
FIG. 4 is block diagram of an analytic server in accordance with at least one embodiment.

FIG. 4 is a block diagram of the analytic server 102 in accordance with at least one embodiment. The analytic server 102 includes a processor 402, a transceiver 404, and a memory 406. The analytic server 102 is described in conjunction with FIG. 1 and FIG. 2.

The processor 402 is coupled to the transceiver 404 and the memory 406. The processor 402 executes a set of instructions stored in the memory 406. The processor 402 can be realized through a number of processor technologies known in the art. Examples of the processor 402 can be, but are not limited to, X86 processor, RISC processor, ASIC processor, and CISC processor.

The transceiver 404 transmits and receives messages and data to/from the various components (e.g., the product database 104, the user database 106, and the customer support center 110) of the system environment 100 (refer FIG. 1). Examples of the transceiver 404 can include, but are not limited to, an antenna, an Ethernet port, a USB port, or any port that can be configured to receive and transmit data from external sources. The transceiver 404 transmits and receives data/messages in accordance with various communication protocols, such as, Transmission Control Protocol and Internet Protocol (TCP/IP), USB, User Datagram Protocol (UDP), 2G, 3G and 4 G communication protocols.

The memory 406 stores a set of instructions and data. Some of the commonly known memory implementations can be, but are not limited to, random access memory (RAM), read only memory (ROM), hard disk drive (HDD), and secure digital (SD) card. The memory 406 includes a program module 408 and a program data 410. The program module 408 includes a set of instructions that can be executed by the processor 402 to perform one or more operations on the analytic server 102. The program module 408 includes a communication manager 412, a search module 414, the NLP module 112, a user profile manager 416, a product database manager 418, and a customer care manager 420. Although the various modules in the program module 408 have been shown in separate blocks, one or more of the modules may be implemented as an integrated module performing the combined functions of the constituent modules.

The program data 410 includes a user profile data 422, a phrase data 424, a category data 426, a product data 428, publication data 430, and rules data 432.

In an embodiment, the communication manager 412 receives a query to create a user profile or to acquire information about a user from the customer support center 110 through the transceiver 404. The communication manager 412 includes various protocol stacks such as, but not limited to, Transmission Control Protocol and Internet Protocol (TCP/IP), User Datagram Protocol (UDP), 2G, 3G or 4 G communication protocols. The communication manager 412 transmits and receives the messages/data through the transceiver 404 in accordance with such protocol stacks.

The search module 414 searches for the one or more electronic publications of the user in the one or more online sources. The searching of the one or more electronic publications has been described in step 202 (refer FIG. 1). In an embodiment, the search module 414 utilizes various searching technologies such as web crawling or extracting content directly from predefined review web sites. Further, the search module 414 stores the one or more electronic publications in the publication data 430.

The NLP module 112 extracts the one or more electronic publications from the publication data 430. Further, the NLP module 112 analyzes sentences in the one or more electronic publications to extract the one or more relevant phrases as described in step 204. In an embodiment, the NLP module 112 includes a natural language parser that extracts the one or more phrases. In an embodiment, some examples of commonly known natural language natural language parser includes, but not limited to, Xerox Incremental Parser (XIP), Stanford Parser, Natural Language Toolkit (NLTK) and the like. The NLP module 112 stores the one or more relevant phrases as the phrase data 424. Additionally, the NLP module 112 classifies each of the one or more relevant phrases in the one or more categories by applying the first set of rules as described in the step 206. The NLP module 112 stores the classified phrases as the category data 426. Further, the NLP module 112 applies the second set of rules to each of the classified phrases to extract the one or more terms as described in the step 208. In an embodiment, the one or more terms are indicative of the information about the user.

The user profile manager 416 creates a user profile based on the one or more terms determined by the NLP module 112 as described in the step 210. Further, the user profile manager 416 stores the user profile as the user profile data 422. In an embodiment, the user profile manager 416 stores the user profile in the user database 106.

The product database manager 418 extracts the one or more product information based on the user profile. In an embodiment, the product database manager 418 creates a SQL query based on the user profile to extract the one or more products. The product database manager 418 stores the one or more product information as the product data 428.

The customer care manager 420 extracts the user profile from the user profile data 422. Further, the customer care manager 420 extracts the one or more product information from the product data 428. Thereafter, the customer care manager 420 communicates the user profile and the one or more product information to the customer support center 110 through the transceiver 404.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for creating user profile using natural language processing (NLP) techniques have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of providing product recommendations to a user, the method comprising:

receiving at a remotely-located customer support center, via a user's voice-call a query about a product;

searching, at an analytics server, a plurality of sources for one or more electronic documents attributed to the user, wherein the searching is initiated in response to receiving a request from the customer support center to create a user profile;

extracting, by the analytics server, one or more phrases from the searched electronic documents using a natural language parser;

classifying, by the analytics server, one or more phrases extracted from one or more electronic documents in a user's experience category by applying a first set of rules comprising phrases indicative of a user's experience with a product;

further classifying, by the analytics server, the one or more phrases into at least one category by applying a first set of rules, wherein the categories comprise at least one of:
a user's preference category that comprises phrases that indicate preferences of the user, and
a user's need category that comprises phrases that indicate needs of the user;

extracting, by the analytics server, a plurality of terms from the one or more classified phrases by applying a second set of rules to the classified phrases, wherein at least one term extracted from a phrase categorized as a user's experience comprises a temporal term that relates the product and the user based on a rule from the second set of rules that comprises extracting a temporal term from a phrase categorized as a user's experience when a verb in the categorized phrase comprises a past tense verb associated with possession and a portion of the categorized phrase refers to a domain of the product;

creating the user profile, at the analytics server, based on the one or more temporal terms extracted from the classified phrases by applying the second set of rules;

communicating, by the analytics server, the created user profile to the customer service center;

determining, at the analytics server, product information based on the created user profile to determine needs and preferences of the user in response to the received query; and returning to the user, via an interactive voice response, product recommendations based on the product information and received query.

2. The method of claim 1 further comprising providing, by the analytics server, one or more services based on the user profile, wherein the one or more services correspond to a product support, a product recommendation, and a troubleshooting.

3. The method of claim 1, wherein a plurality of sources for one or more electronic documents attributed to the user include online sources corresponding to at least one of a product review website, a blog, a forum, or an e-mail.

4. The method of claim 1, wherein the classification is performed using one or more NLP techniques comprising one or more of word tokenization, word lemmatization, part-of-speech tagging, Named Entity detection, or syntactic parsing.

5. The method of claim 1, wherein at least a subset of the one or more electronic documents are creatable from a voice call by applying one or more speech to text (STT) conversion techniques, wherein the user initiates the voice call to obtain information about a product.

6. A method of providing one or more services to a user, the method comprising:

receiving at a remotely-located customer support center, via a user's voice-call a query about a product;

searching, at an analytics server, a plurality of sources for one or more electronic documents attributed to a user, wherein the searching is initiated in response to receiving a request from the customer support center to create a user profile;

extracting, by the analytics server, one or more phrases from the searched electronic documents using a natural language parser;

classifying, by the analytics server, one or more phrases extracted from one or more electronic documents in a user's experience category by applying a first set of rules comprising phrases indicative of a user's experience with a product;

further classifying, by the analytics server, the one or more phrases into at least one category by applying a first set of rules, wherein the categories comprise at least one of:
a user's preference category that comprises phrases that indicate preferences of the user, and
a user's need category that comprises phrases that indicate needs of the user; and extracting, by the analytics server, a plurality of terms from the one or more classified phrases by applying a second set of rules to the classified phrases, wherein at least one term extracted from a phrase categorized as a user's experience comprises a temporal term that relates a product and the user based on a rule from the second set of rules that comprises extracting a temporal term from a phrase categorized as a user's experience when a verb in the categorized phrase comprises a past tense verb associated with possession and a portion of the categorized phrase refers to a domain of the product;

creating the user profile, at the analytics server, based on the one or more temporal terms extracted from the classified phrases by applying the second set of rules;

communicating, by the analytics server, the created user profile to the customer service center;

determining, at the analytics server, product information based on the created user profile to determine needs and preferences of the user in response to the received query; and returning to a user, via an interactive voice response, product recommendations based on the product information and received query.

7. The method of claim 6, a plurality of sources for one or more electronic documents attributed to the user include online sources corresponding to at least one of a product review website, a blog, a forum, or an e-mail.

8. The method of claim 6, wherein the classifying is performed using one or more NLP techniques comprising one or more of word tokenization, word lemmatization, part-of-speech tagging, Named Entity detection, or syntactic parsing.

9. A system for creating a user profile, the system comprising:
a remotely-located customer support center configured to:
receive, via a user's voice-call a query about a product; and
an analytics server configured to:
search a plurality of sources for one or more electronic documents attributed to a user, wherein the searching is initiated in response to receiving a request from the customer support center to create a user profile;
extract one or more phrases from the searched electronic documents using a natural language parser;
classify one or more phrases extracted from one or more electronic documents in a user's experience category by applying a first set of rules comprising phrases indicative of a user's experience with a product;
further classify the one or more phrases into at least one category by applying a first set of rules, wherein the categories comprise at least one of:
a user's preference category that comprises phrases that indicate preferences of the user, and
a user's need category that comprises phrases that indicate needs of the user;

extract a plurality of terms from the one or more classified phrases by applying a second set of rules to the classified phrases, wherein at least one term extracted from a phrase categorized as a user's experience comprises a temporal term that relates a product and the user based on a rule from the second set of rules that comprises extracting a temporal term from a phrase categorized as a user's experience when a verb in the categorized phrase comprises a past tense verb associated with possession and a portion of the categorized phrase refers to a domain of the product;

create the user profile based on the one or more temporal terms extracted from the classified phrases by applying the second set of rules;

communicate the created user profile to the customer service center;

determine product information based on the created user profile to determine needs and preferences of the user in response to the received query; and return to a user, via an interactive voice response, product recommendations based on the product information and received query.

10. The system of claim 9, wherein a plurality of sources for one or more electronic documents attributed to the user include online sources corresponding to at least one of a product review website, a blog, a forum, or an e-mail.

11. The system of claim 9, wherein the analytics server utilizes one or more NLP techniques comprising one or more of word tokenization, word lemmatization, part-of-speech tagging, Named Entity detection, or syntactic parsing, to classify the one or more phrases.

12. The system of claim 9, wherein at least a subset of the one or more electronic documents are creatable from a voice call by applying one or more speech to text (STT) conversion techniques, wherein the user initiates the voice call to obtain information about a product.

13. The method of claim 1, wherein determining, by the analytics server, product information is based on a length of experience for the user with the product, wherein the length of experience is calculated based on the extracted temporal term and a current date.

14. The method of claim 6, wherein determining, by the analytics server, product information is based on a length of experience for the user with the product, wherein the length of experience is calculated based on the extracted temporal term and a current date.

15. The system of claim 9, wherein determining, by the analytics server, product information is based on a length of experience for the user with the product, wherein the length of experience is calculated based on the extracted temporal term and a current date.

* * * * *